(12) United States Patent
Kondo

(10) Patent No.: US 6,266,371 B1
(45) Date of Patent: *Jul. 24, 2001

(54) MOTION VECTOR DETECTING APPARATUS AND METHOD

(75) Inventor: Tetsujiro Kondo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/735,319

(22) Filed: Oct. 25, 1996

Related U.S. Application Data

(63) Continuation of application No. 08/302,407, filed on Sep. 8, 1994, now abandoned.

(30) Foreign Application Priority Data

Sep. 9, 1993 (JP) .................................... 5-248813
Sep. 9, 1993 (JP) .................................... 5-248815

(51) Int. Cl.[7] ....................................... H04N 7/32
(52) U.S. Cl. ............... 375/240.16; 348/699; 375/240.24
(58) Field of Search .......................... 348/390, 400–402, 348/407, 409–413, 415, 416, 420, 421, 699; 375/240, 240.01, 240.12–240.17, 240.24; 382/232, 236, 238; H04N 7/32

(56) References Cited

U.S. PATENT DOCUMENTS

| | | | |
|---|---|---|---|
| 5,049,990 | * 9/1991 | Kondo et al. | 348/421 |
| 5,105,271 | * 4/1992 | Niihara | 348/699 |
| 5,200,820 | * 4/1993 | Gharavi | 348/699 |
| 5,235,419 | * 8/1993 | Krause | 348/416 |
| 5,278,915 | 1/1994 | Chupeau et al. | |
| 5,327,232 | * 7/1994 | Kim | 348/699 |
| 5,347,309 | * 9/1994 | Takahashi | 348/420 |
| 5,387,937 | * 2/1995 | Dorricott et al. | 348/699 |
| 5,576,772 | * 11/1996 | Kondo | 375/240.14 |

FOREIGN PATENT DOCUMENTS

| | | |
|---|---|---|
| 0 420 653 | 4/1991 | (EP) . |
| 0 460 997 | 12/1991 | (EP) . |
| 0 510 972 | 10/1992 | (EP) . |
| 0 520 765 | 12/1992 | (EP) . |
| 2 264 415 | 8/1993 | (GB) . |

* cited by examiner

*Primary Examiner*—Richard Lee
(74) *Attorney, Agent, or Firm*—Frommer Lawrence & Haug, LLP.; William S. Frommer; Glenn F. Savit

(57) ABSTRACT

A motion vector is detected between a base block of a present frame and an inspection block of a reference frame, which is moved in a predetermined search range of the reference frame, on the basis of constant and transient components extracted from the base and inspection blocks. The constant (low frequency) component may be the mean value of the pixels of the block. The transient (high frequency) component may be the standard deviation of the pixels of the block. The base and inspection blocks may be respectively segmented into small blocks, and the constant and transient components of the small blocks obtained, compared and summed.

20 Claims, 14 Drawing Sheets

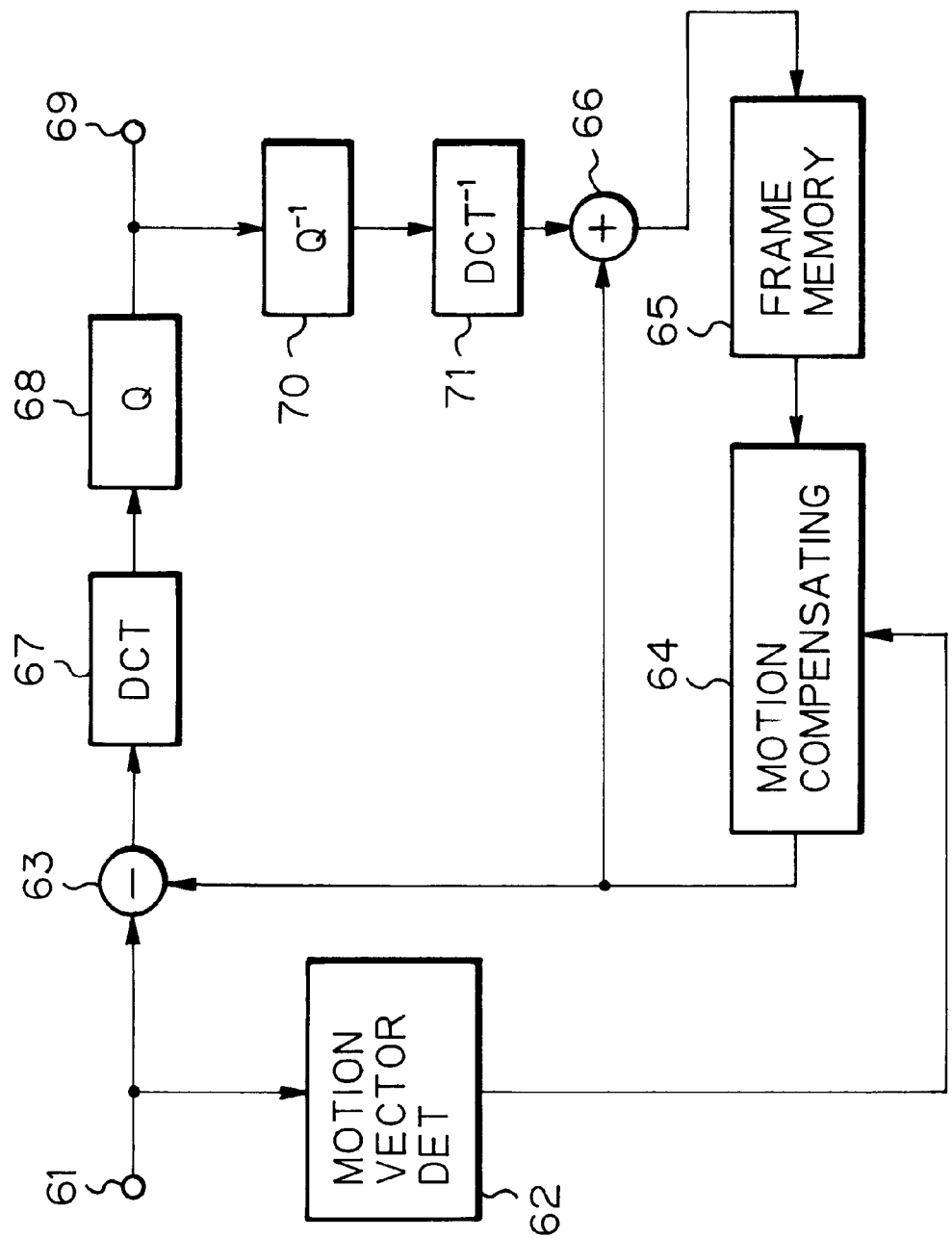

Fig. 6A

| 124 | 125 | 125 | 124 | 125 | 134 | 145 | 154 |
|-----|-----|-----|-----|-----|-----|-----|-----|
| 125 | 115 | 105 | 91  | 93  | 115 | 140 | 156 |
| 118 | 101 | 89  | 102 | 143 | 173 | 190 | 189 |
| 70  | 60  | 93  | 142 | 170 | 185 | 189 | 178 |
| 164 | 163 | 167 | 173 | 172 | 171 | 170 | 163 |
| 165 | 164 | 160 | 152 | 150 | 148 | 146 | 144 |
| 140 | 149 | 153 | 149 | 149 | 146 | 141 | 136 |
| 133 | 135 | 137 | 136 | 136 | 141 | 144 | 142 |

Fig. 6B

| 122  |  | 111 |  | 117 |  | 149 |  |
|------|--|-----|--|-----|--|-----|--|
|      |  |     |  |     |  |     |  |
| 87.3 |  | 107 |  | 168 |  | 187 |  |
|      |  |     |  |     |  |     |  |
| 164  |  | 163 |  | 160 |  | 156 |  |
|      |  |     |  |     |  |     |  |
| 139  |  | 144 |  | 143 |  | 141 |  |
|      |  |     |  |     |  |     |  |

Fig. 6C

| 3.63 |  | 13.3 |  | 12.8 |  | 6.25 |  |
|------|--|------|--|------|--|------|--|
|      |  |      |  |      |  |      |  |
| 22.3 |  | 17.8 |  | 12.4 |  | 4.25 |  |
|      |  |      |  |      |  |      |  |
| 0.5  |  | 7    |  | 11.3 |  | 10.8 |  |
|      |  |      |  |      |  |      |  |
| 5.25 |  | 7.25 |  | 4.5  |  | 2.38 |  |
|      |  |      |  |      |  |      |  |

Fig. 7A

| 125 | 125 | 124 | 125 | 134 | 145 | 154 | 163 |
|-----|-----|-----|-----|-----|-----|-----|-----|
| 115 | 105 | 91  | 93  | 115 | 140 | 156 | 171 |
| 101 | 89  | 102 | 143 | 173 | 190 | 189 | 185 |
| 60  | 93  | 142 | 170 | 185 | 189 | 178 | 172 |
| 163 | 167 | 173 | 172 | 171 | 170 | 163 | 154 |
| 164 | 160 | 152 | 150 | 148 | 146 | 144 | 138 |
| 149 | 153 | 149 | 149 | 146 | 141 | 136 | 133 |
| 135 | 137 | 136 | 136 | 141 | 144 | 142 | 140 |

Fig. 7B

| 118  |  | 108 |  | 134 |  | 161 |  |
|------|--|-----|--|-----|--|-----|--|
|      |  |     |  |     |  |     |  |
| 85.8 |  | 139 |  | 184 |  | 181 |  |
|      |  |     |  |     |  |     |  |
| 164  |  | 162 |  | 159 |  | 150 |  |
|      |  |     |  |     |  |     |  |
| 144  |  | 143 |  | 143 |  | 138 |  |
|      |  |     |  |     |  |     |  |

Fig. 7C

| 7.5  |  | 16.3 |  | 9.25 |  | 6    |  |
|------|--|------|--|------|--|------|--|
|      |  |      |  |      |  |      |  |
| 12.9 |  | 18.6 |  | 5.63 |  | 6    |  |
|      |  |      |  |      |  |      |  |
| 2    |  | 10.8 |  | 11.8 |  | 8.75 |  |
|      |  |      |  |      |  |      |  |
| 7.5  |  | 6.5  |  | 2    |  | 3.25 |  |
|      |  |      |  |      |  |      |  |

Fig. 8A

| 138 | 141 | 143 | 144 | 146 | 145 | 137 | 131 | 131 | 135 | 137 | 131 | 126 | 121 | 111 | 101 |
|---|---|---|---|---|---|---|---|---|---|---|---|---|---|---|---|
| 157 | 154 | 148 | 145 | 147 | 146 | 145 | 144 | 143 | 145 | 140 | 128 | 116 | 107 | 103 | 103 |
| 153 | 150 | 144 | 139 | 139 | 142 | 144 | 148 | 152 | 155 | 159 | 157 | 141 | 123 | 115 | 105 |
| 142 | 138 | 138 | 140 | 143 | 148 | 153 | 156 | 158 | 165 | 166 | 162 | 156 | 148 | 136 | 117 |
| 152 | 147 | 139 | 134 | 131 | 131 | 139 | 140 | 140 | 140 | 136 | 135 | 132 | 130 | 124 | 112 |
| 153 | 153 | 154 | 158 | 153 | 150 | 147 | 144 | 149 | 152 | 155 | 157 | 149 | 145 | 139 | 124 |
| 175 | 180 | 187 | 190 | 190 | 191 | 189 | 181 | 174 | 171 | 170 | 172 | 171 | 174 | 170 | 153 |
| 151 | 151 | 152 | 153 | 157 | 166 | 170 | 172 | 175 | 176 | 176 | 175 | 175 | 179 | 177 | 170 |
| 119 | 124 | 124 | 125 | 125 | 124 | 125 | 134 | 145 | 154 | 163 | 170 | 174 | 177 | 171 | 162 |
| 126 | 130 | 125 | 115 | 105 | 91 | 93 | 115 | 140 | 156 | 171 | 179 | 179 | 178 | 168 | 153 |
| 121 | 124 | 118 | 101 | 89 | 102 | 143 | 173 | 190 | 189 | 185 | 180 | 174 | 170 | 155 | 139 |
| 131 | 101 | 70 | 60 | 93 | 142 | 170 | 185 | 189 | 178 | 172 | 167 | 162 | 157 | 142 | 128 |
| 195 | 178 | 164 | 163 | 167 | 173 | 172 | 171 | 170 | 163 | 154 | 152 | 146 | 136 | 121 | 107 |
| 170 | 165 | 165 | 164 | 160 | 152 | 150 | 148 | 146 | 144 | 138 | 137 | 133 | 127 | 115 | 113 |
| 152 | 140 | 140 | 149 | 153 | 149 | 149 | 146 | 141 | 136 | 133 | 133 | 133 | 130 | 125 | 131 |
| 148 | 136 | 133 | 135 | 137 | 136 | 136 | 141 | 144 | 142 | 140 | 138 | 138 | 136 | 138 | 144 |

Fig. 8B

| | | | | | | | | | | | | | | | | | | |
|---|---|---|---|---|---|---|---|---|---|---|---|---|---|---|---|---|---|---|
| 145 | | | 158 | | | 113 | | | 156 | | | | | | | | | |
| | | | | | | | | | | | | | | | | | | |
| 145 | | | 159 | | | 126 | | | 153 | | | | | | | | | |
| | | | | | | | | | | | | | | | | | | |
| 148 | | | 160 | | | 171 | | | 144 | | | | | | | | | |
| | | | | | | | | | | | | | | | | | | |
| 121 | | | 152 | | | 162 | | | 130 | | | | | | | | | |
| | | | | | | | | | | | | | | | | | | |

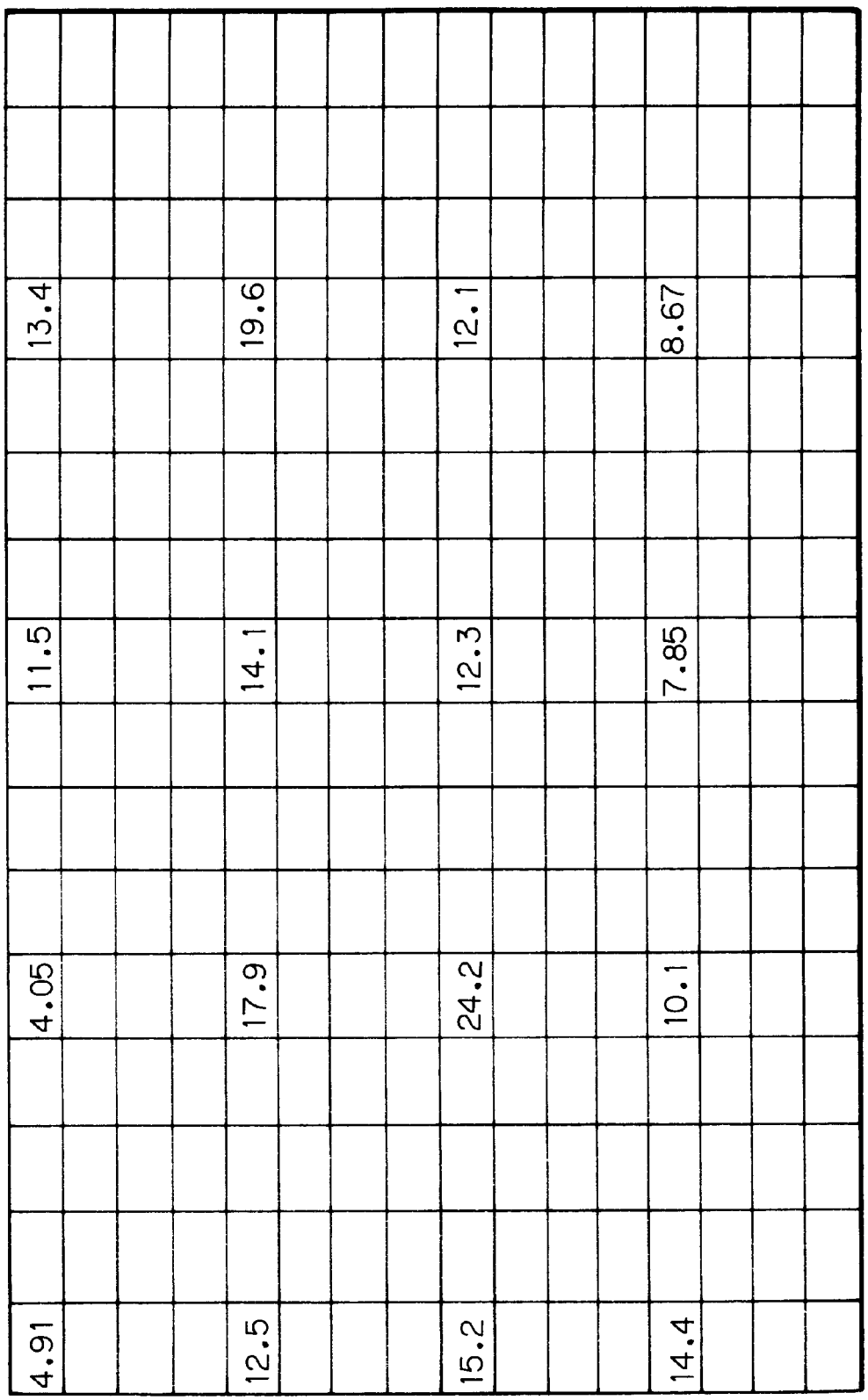

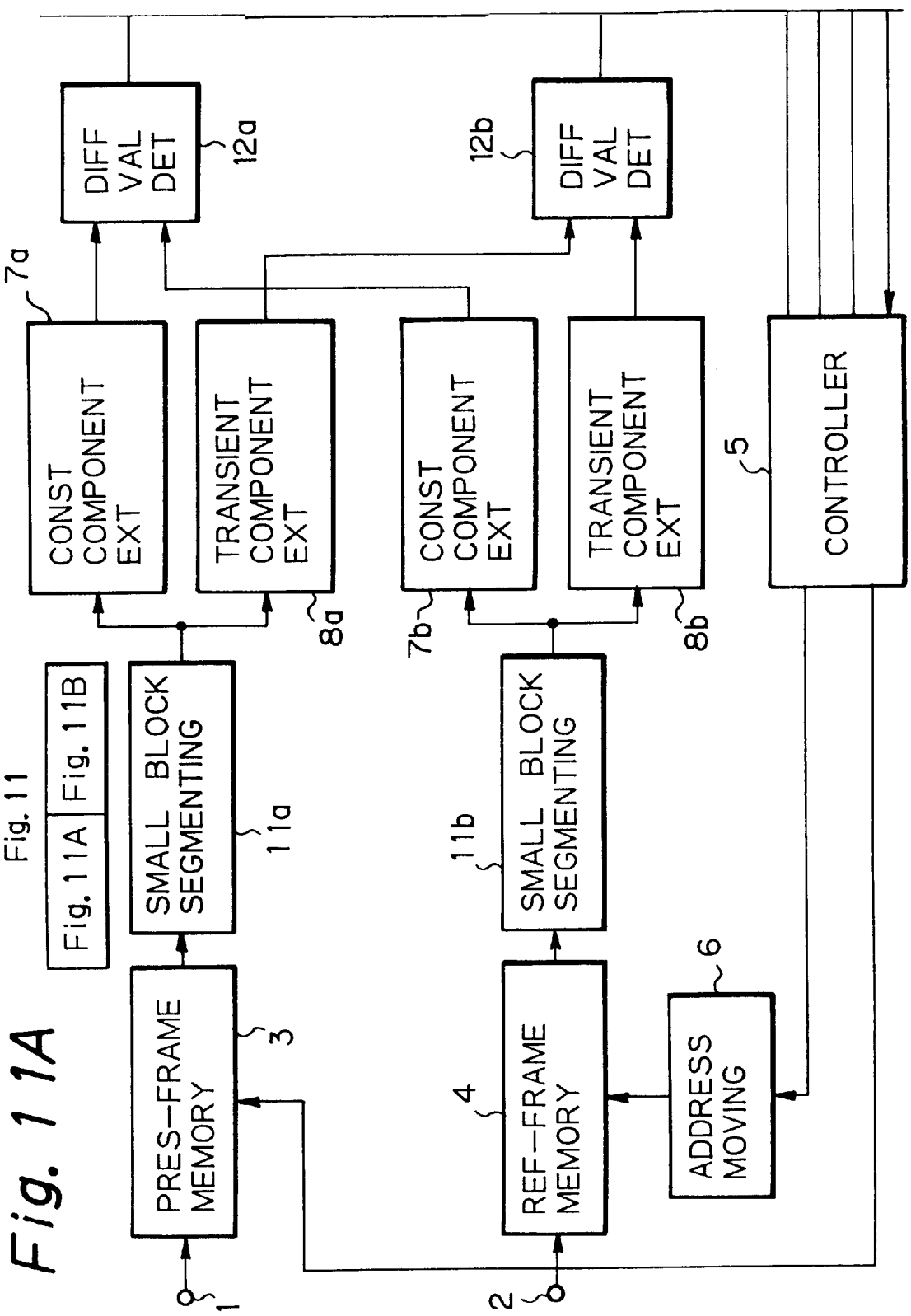

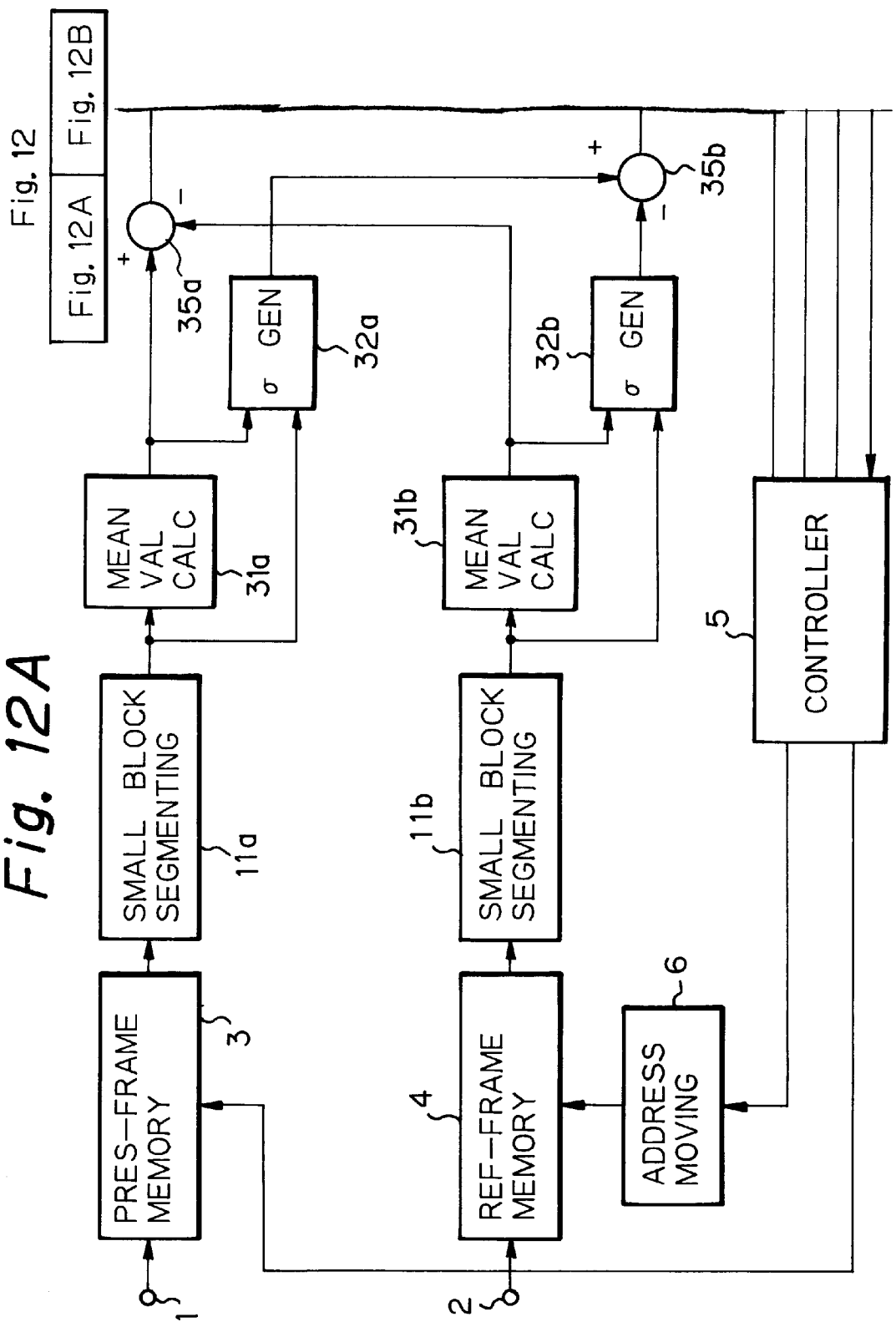

MOTION VECTOR DETECTING APPARATUS AND METHOD

This application is a continuation of application Ser. No. 08/302,407, filed Sep. 8, 1994 now abandoned.

BACKGROUND OF THE INVENTION

The present invention relates to detection of a motion vector between a block in an image and a corresponding block in another image, and, more particularly, is directed to reducing the number of operations required to detect a motion vector while maintaining the accuracy of the detected motion vector.

Motion vectors are useful in predictive coding of a series of digital images, which reduces the amount of information needed to represent the series of images. For example, the Moving Picture Coding Experts Group (MPEG) international standard for highly efficient coding of moving pictures employs orthogonal transformation, specifically a discrete cosine transformation (DCT), and predictive encoding with motion compensation.

FIG. 1 shows an example of a predictive encoding circuit using motion compensation. Digital video data for a present frame of video is supplied to input terminal 61, which supplies the digital video data to a motion vector detecting circuit 62 and a subtracting circuit 63.

The motion vector detecting circuit 62 detects a motion vector for a block of the present frame relative to a reference frame, which may be a frame that temporally precedes the present frame, and supplies the motion vector to a motion compensating circuit 64.

Frame memory 65 is adapted to store an image such as the preceding frame which, when motion compensated, forms the prediction for the present image, and to supply this image to the motion compensating circuit 64.

The motion compensating circuit 64 is operative to perform motion compensation of the image supplied thereto from frame memory 65 using the motion vector supplied thereto from the motion vector detecting circuit 62, and to supply the motion compensated image to a subtracting circuit 63 and an adding circuit 66. Specifically, the circuit 64 moves each block of the image to the position indicated by the corresponding motion vector.

The subtracting circuit 63 subtracts the motion compensated preceding frame received from the motion compensating circuit 64 from the video data of the present frame, on a pixel by pixel basis, to produce differential data and supplies the differential data to a DCT circuit 67.

The DCT circuit 67 functions to orthogonally transform the differential data to produce coefficient data, and applies the coefficient data to a quantizing circuit 68 which is adapted to quantize the coefficient data and to supply the quantized coefficient data to an output terminal 69 and to an inverse quantizing circuit 70.

The inverse quantizing circuit 70 recovers the coefficient data from the quantized coefficient data, and applies the recovered coefficient data to an inverse DCT circuit 71 which converts the coefficient data to decoded differential image data and supplies the decoded differential image data to the adding circuit 66.

The adding circuit 66 adds the decoded differential image data to the motion compensated image data from the circuit 64 to produce decoded image data and applies the decoded image data to the frame memory 65 for storage therein.

The operation of motion vector detection performed by the motion vector detection circuit 62 will now be described with reference to FIGS. 2–4.

The motion vector detecting circuit 62 uses a block matching method to detect motion vectors. In the block matching method, an inspection block of a reference frame is moved in a predetermined searching range to identify the block in the predetermined searching range that best matches a base block of the present frame. The motion vector is the difference between the co-ordinates of the base block and the co-ordinates of the best matching block in the reference frame.

FIG. 2A shows an image of one frame comprising H horizontal pixels×V vertical lines, which are divided into blocks of size P pixels×Q lines. FIG. 2B shows a block in which P=5, Q=5, and "c" represents the center pixel of the block.

FIG. 3A shows a base block of a present frame having a center pixel c and an inspection block of a reference frame having a center pixel c'. The inspection block is positioned at the block of the reference frame which best matches the base block of the present frame. As can be seen from FIG. 3A, when the center pixel c of the base block is moved by +1 pixel in the horizontal direction and +1 line in the vertical direction, the center pixel c is co-located with the center pixel c'. Thus, a motion vector (+1, +1) is obtained. Similarly, for the positions of the best matching block relative to the base block shown in FIGS. 3B and 3C, respective motion vectors of (+3, +3) and (+2, −1) are obtained. A motion vector is obtained for each base block of the present frame.

The predetermined search range through which the inspection block is moved in the reference frame may be ±S pixels in the horizontal direction and ±T lines in the vertical direction, that is, the base block is compared with an inspection block having a center pixel c' that varies from a center pixel c of the base block for ±S pixels in the horizontal direction and ±T lines in vertical direction. FIG. 4 shows that a base block R with a center pixel c of a present frame should be compared with {(2S+1)×(2T+1)} inspection blocks of a reference frame. In FIG. 4, S=4 and T=3. The searching range of FIG. 4 is a region consisting of the centers of each of the inspection blocks. The size of the searching range that contains the entirety of the inspection blocks is (2S+P)×(2T+Q), i.e., ((P−1)/2+(2S+1)+(P−1)/2)× ((Q−1)/2+(2T+1)+(Q−1)/2).

The comparison of a base block with an inspection block at a particular position in the predetermined search range comprises obtaining evaluating values, such as the sum of absolute values of differential values of frames, the sum of squares of differential values of frames, or the sum of n-th power of absolute values of differential values of frames, detecting the minimum of the evaluating values to identify the best matching block, and producing a motion vector between the base block and the best matching block.

FIG. 5 shows an example of the motion vector detection circuit 62.

Image data for a present frame is applied to an input terminal 81, which supplies the image data to a present frame memory 83 for storage. Image data for a reference frame is applied to an input terminal 82, which supplies the image data to a reference frame memory 84 for storage.

Controller 85 controls reading and writing of the present frame memory 83 and the reference frame memory 84 which respectively supply pixel data of a base block of the present frame and pixel data of an inspection block of the reference frame to differential value detecting circuit 87. An address moving circuit 86 is associated with the reference-frame memory 84. The controller 85 controls the address moving circuit 86 to apply read addresses to the reference frame memory 84 which move, pixel by pixel, the position of the inspection block in the predetermined searching range.

The differential value detecting circuit 87 obtains the differential value between the output signals of the present frame memory 83 and the reference frame memory 84 on a pixel by pixel basis and supplies the differential values to an absolute value calculating circuit 88 which obtains the absolute value of the differential values and supplies the absolute value to an accumulating circuit 89. The accumulating circuit 89 sums the absolute values of the differential values for each block to produce an evaluating value for the base block relative to the inspection block at a particular position in the predetermined search range and supplies the evaluating value to a determining circuit 90.

The determining circuit 90 identifies the minimum evaluating value in the predetermined search range. The best matching block in the predetermined search range of the reference frame corresponds to the minimum evaluating value. The circuit 90 also produces a motion vector between the base block of the present frame and the best matching block in the predetermined search range of the reference frame.

The conventional block matching method requires a large amount of hardware and a large number of arithmetic operations. For the situation shown in FIG. 4, (P×Q) absolute values of differential values should be summed $\{(2S+1)\times(2T+1)\}$ times. Thus, the number of arithmetic operations for this process is expressed as $\{(P\times Q)\times(2S+1)\times(2T+1)\}$.

To overcome these disadvantage of the conventional block matching method, various methods have been proposed.

In the first of these proposed methods, to decrease the number of elements of a block, a method for decomposing a base block and an inspection block into small blocks in the horizontal and vertical directions and extracting a feature value for each small block has been proposed. The feature value may be, for example, the sum of the magnitudes of the pixels in the small blocks. The feature values of each of the small blocks in the horizontal direction of each of the base block and the inspection block are compared, and the feature values of each of the small blocks in the vertical direction of each of the base block and the inspection block are compared. Absolute values of the compared results are summed. The weighted mean value of the summed results is used as the evaluating values for the base and inspection blocks. This method, described in detail in U.S. application Ser. No. 08/283,830, reduces the number of arithmetic operations to the number of small blocks in the horizontal and vertical directions.

In the second of these proposed methods, to simplify the searching process, in a first stage, the inspection block is moved every several pixels to coarsely detect a motion vector. In a second stage, the inspection block is moved near the position indicated by the coarse motion vector every pixel to finely detect a motion vector. This method is referred to as a two-step method. In addition, a three-step method where a motion vector is obtained in three steps is also known. In the three-step method, the number of arithmetic operations corresponding to all the pixels in the searching range can be reduced to the number of arithmetic operations corresponding to the pixels near the motion vector detected in each step.

Yet another proposed method which both decreases the number of elements of a block and simplifies the searching process, known as the thin-out method, employs a hierarchical construction. The number of pixels in a block is sampled and thinned out (for example, four pixels are thinned out to one pixel, or two pixels are thinned out to one pixel). Blocks constructed of the thinned-out pixels are compared. Thereafter, the origin of the block matching process is moved to the position of the minimum detected value. A motion vector is detected by the block matching process, pixel by pixel. As the result of the thin-out process, both the number of elements in a block and the number of arithmetic operations in the searching range decrease.

A further proposed method which both decreases the number of elements of a block and simplifies the searching process, employs a low pass filter. In this method, a hierarchical construction is defined where there are a first hierarchical stage where an original image is supplied, a second hierarchical stage where the number of pixels of the original image signal in the first hierarchical stage is thinned out by ½ in the horizontal and vertical directions with a low-pass filter and a sub-sampling circuit, and a third hierarchical stage where the number of pixels of the image signal in the second hierarchical stage is thinned out by ½ in the horizontal direction and vertical directions with a low-pass filter and a sub-sampling circuit. The block-matching process is performed for the image signal in the third hierarchical stage. The origin of the block matching process is moved to the position corresponding to the detected minimum evaluating value. The block matching process is performed for the image signal in the second hierarchical stage. The origin of the block matching process is moved to the position corresponding to the detected minimum value. The block matching process is performed for the image signal in the first hierarchical stage.

A problem with each of the above mentioned proposed methods for reducing the number of arithmetic operations in the block matching method for detecting motion vectors is that each of these methods may produce an erroneous result since the amount of information in an original image is lost due to simplification carried out by the searching process.

Specifically, when the number of elements of a block is decreased, a feature value of a small block that has been passed through a low-pass filter is used. When the searching process is simplified, since a motion vector is coarsely detected, the accuracy is low. Thus, an error may take place. When the number of elements is decreased and the searching process is simplified, since a motion vector is detected corresponding to a thinned-out image or an image that has passed through a low-pass filter, an error may take place.

OBJECTS AND SUMMARY OF THE INVENTION

Therefore, an object of the present invention is to provide a method and apparatus for detecting motion vectors which avoids the aforementioned disadvantages of the prior art.

Another object of the present invention is to provide a method and apparatus for detecting motion vectors which reduces the number of arithmetic operations relative to the conventional block matching method.

Yet another object of the present invention is to provide a method and apparatus for detecting motion vectors which can be implemented with a simple hardware construction.

A further object of the present invention is to provide a method and apparatus for detecting motion vectors which reduces the possibility of producing an erroneous result.

In accordance with an aspect of this invention, a method and apparatus for detecting a motion vector are provided.

Image data of a base block of a first image are supplied, and a constant component and a transient component of the base block are obtained. Image data of an inspection block of a second image are supplied in response to a control signal which indicates different positions in the second image. A constant component and a transient component of the inspection block are obtained. The constant and transient components of the base and inspection blocks are compared to determine the position of the inspection block in the second image which best matches the base block.

Also in accordance with this invention, the base and inspection blocks are formed into respective small blocks. First differences between the constant components of the small blocks of the base block and the inspection block are obtained and combined to produce a first cumulative difference. Second differences between the transient components of the small blocks of the base block and the inspection block are obtained and combined to produce a second cumulative difference. The best matching position of the inspection block in the second image is determined as a function of the first and second cumulative differences.

The above, and other objects, features and advantages of the present invention will be apparent from the following detailed description of the preferred embodiments of the present invention when read in conjunction with the accompanying drawings in which corresponding parts are identified by the same reference numeral.

BRIEF DESCRIPTION OF THE DRAWINGS

FIG. 1 is a block diagram showing a conventional predictive encoding circuit using motion compensation;

FIGS. 6A–6C are diagrams illustrating the pixel values of a (8×8) region, average values of sub-areas of the region, and standard deviations of the sub-areas of the region, respectively;

FIGS. 7A–7C are diagrams illustrating the pixel values of the region of FIG. 6A, as shifted, average values of sub-areas of the shifted region, and standard deviations of the sub-areas of the shifted region, respectively;

FIGS. 8A–8C are diagrams illustrating the pixel values of a (16×16) region, average values of sub-areas of the region, and standard deviations of the sub-areas of the region, respectively;

DETAILED DESCRIPTION OF THE PREFERRED EMBODIMENTS

Figure 2A:
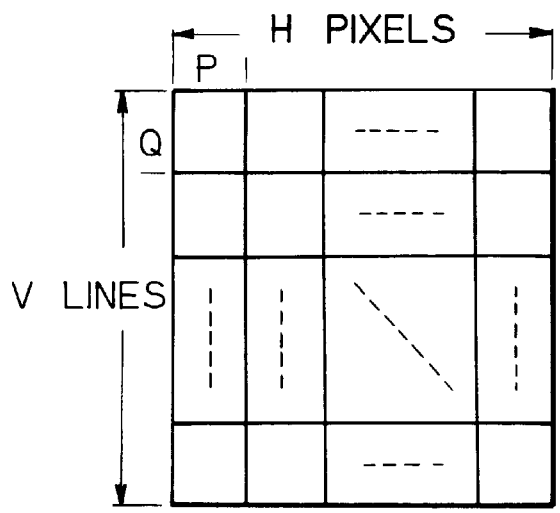
FIG. 2A is a schematic diagram illustrating the blocks of an image.
Figure 2B:
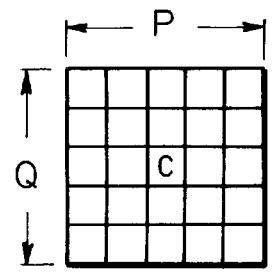
FIG. 2B is a schematic diagram illustrating the pixels and lines of a block shown in FIG. 2A.
Figure 3A:
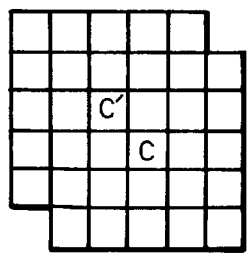
FIGS. 3A–3C are schematic diagrams illustrating motion vectors between a base block of a present frame and an inspection block of a reference frame.
Figure 3B:
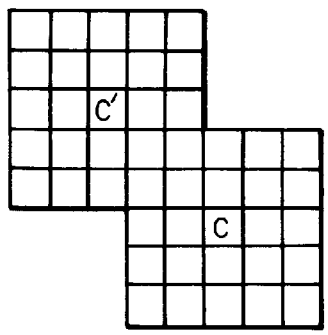
Figure 3C:
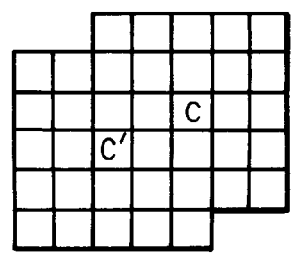
Figure 4:
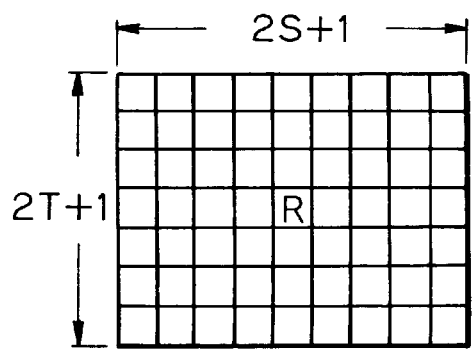
FIG. 4 is a schematic diagram illustrating a predetermined search range around a base block.
Figure 5:
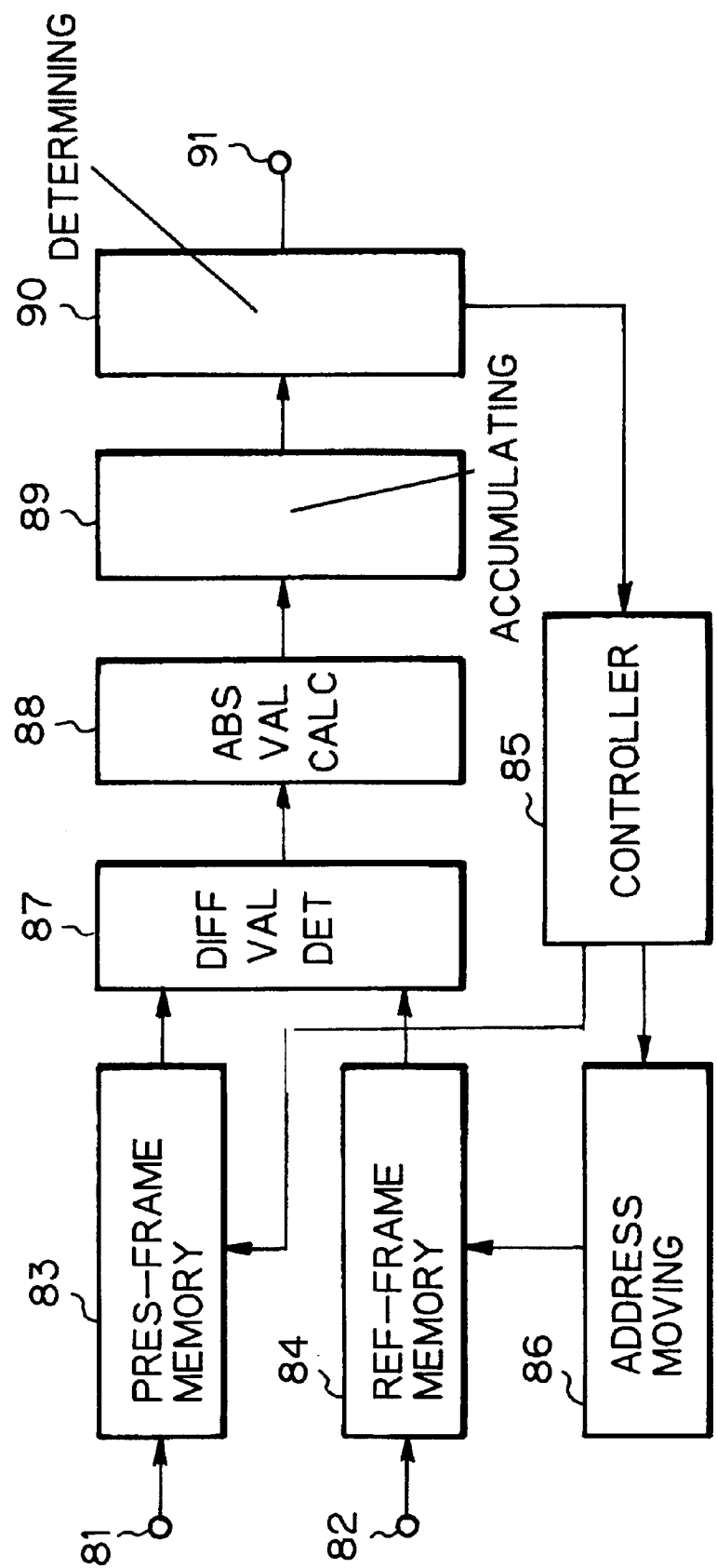
FIG. 5 is a block diagram showing a conventional circuit for producing a motion vector using a block matching method.

The prior art proposed improvements of the block matching method for detecting motion vectors produce erroneous results because too much information is lost when representing a group of pixels by a representative value, such as a feature value.

In the present invention, a group of pixels, such as a block, is represented by two values, a constant component and a transient component. This allows more of the original information to be preserved, while permitting a reduction in the number of calculations needed to determine the best matching block in the predetermined search range of the reference frame relative to the base block in the present frame. The constant and transient components of the base block and the inspection block at various positions in the predetermined search range are compared, and the best matching block is determined as a function of both the constant and transient components.

Since the number of inspection points of pixels of a block and the searching range in the present invention are remarkably decreased relative to the conventional block matching method, the number of arithmetic operations can be sufficiently reduced.

The constant component of a group of pixels may be, for example, one of a mean value, a low frequency component, a low order component of a set of orthogonally transformed coefficients, a maximum value, a minimum value, and so forth. The prior art proposed improvements of the block matching method represent a group of pixels using only a constant component.

The transient component of a group of pixels may be, for example, one of a standard deviation, a high frequency component, a high order component of a set of orthogonally transformed coefficients, a dynamic range, a differential value of mean values, a maximum value of differential values of mean values, and so forth. For example, if the pixels in a block have values (8, 32, 0, 20), the mean value in the block is "15", the differential value of mean values is $|8-15|+|32-15|+|0-15|+|20-15|=44$, and the maximum value of differential values is $|32-15|=17$. Transient components represent degrees of local activities of images, that is, the degree of signal level variations or the amount of high frequency components. The prior art proposed improvements of the block matching method fail to retain information regarding the transient component of a group of pixels.

The oversimplification of the prior art proposed improvements will now be illustrated.

FIG. 6A is a table showing pixel values in a region of (8×8) pixels. These values represent signal levels (amplitudes) in a range (0 to 255) wherein eight bits represent each pixel. FIG. 6B is a table showing mean values calculated for every group of (2×2=4 pixels) which form constant component feature amounts. FIG. 6C is a table showing standard deviations calculated for every (2×2) group which form transient component feature amounts.

In FIG. 6B, mean values "164" and "163" are very close values. However, as shown in FIG. 6C, the standard deviations corresponding to the mean values "164" and "163" are "0.5" and "7", respectively, which differ greatly from each other. This is because the level variations of the two (2×2) blocks greatly differ from each other. Although the prior art proposed improvements of the block matching method would consider these (2× 2) blocks to be quite similar, it is seen that they are actually dissimilar.

FIG. 7A shows a region constructed of (8×8) pixels where the leftmost column of the table shown in FIG. 6A is removed and a new column is added at the right of the table of FIG. 6A. FIGS. 7B and 7C show mean values and standard deviations calculated in the same manner as for FIGS. 6B and 6C, respectively.

In FIG. 7B, the mean values corresponding to "164" and "163" in FIG. 6B are "164" and "162", respectively. In FIG. 7C, the standard deviations corresponding to "164" and "162" shown in FIG. 6C are "2" and "10.8", respectively. In this example, it is clear that the difference of the standard deviations is larger than the difference of the mean values.

FIG. 8A is a table showing pixel values in a region or block of (16×16) pixels. FIGS. 8B and 8C show mean values and standard deviations calculated in the same manner as for FIGS. 6B and 6C, respectively, except that these values are calculated for blocks of size (4×4), rather than (2×2). It will be seen that although the mean values of the two (4×4) blocks in the upper left of the (16×16) block are the same, namely "145", the standard deviations are different, namely, "4.91" and "4.05".

Thus, FIGS. 6–8 demonstrate that local features of images of (2×2) blocks of pixels or (4×4) groups of pixels cannot be adequately represented with constant component feature amounts.

Figure 9:
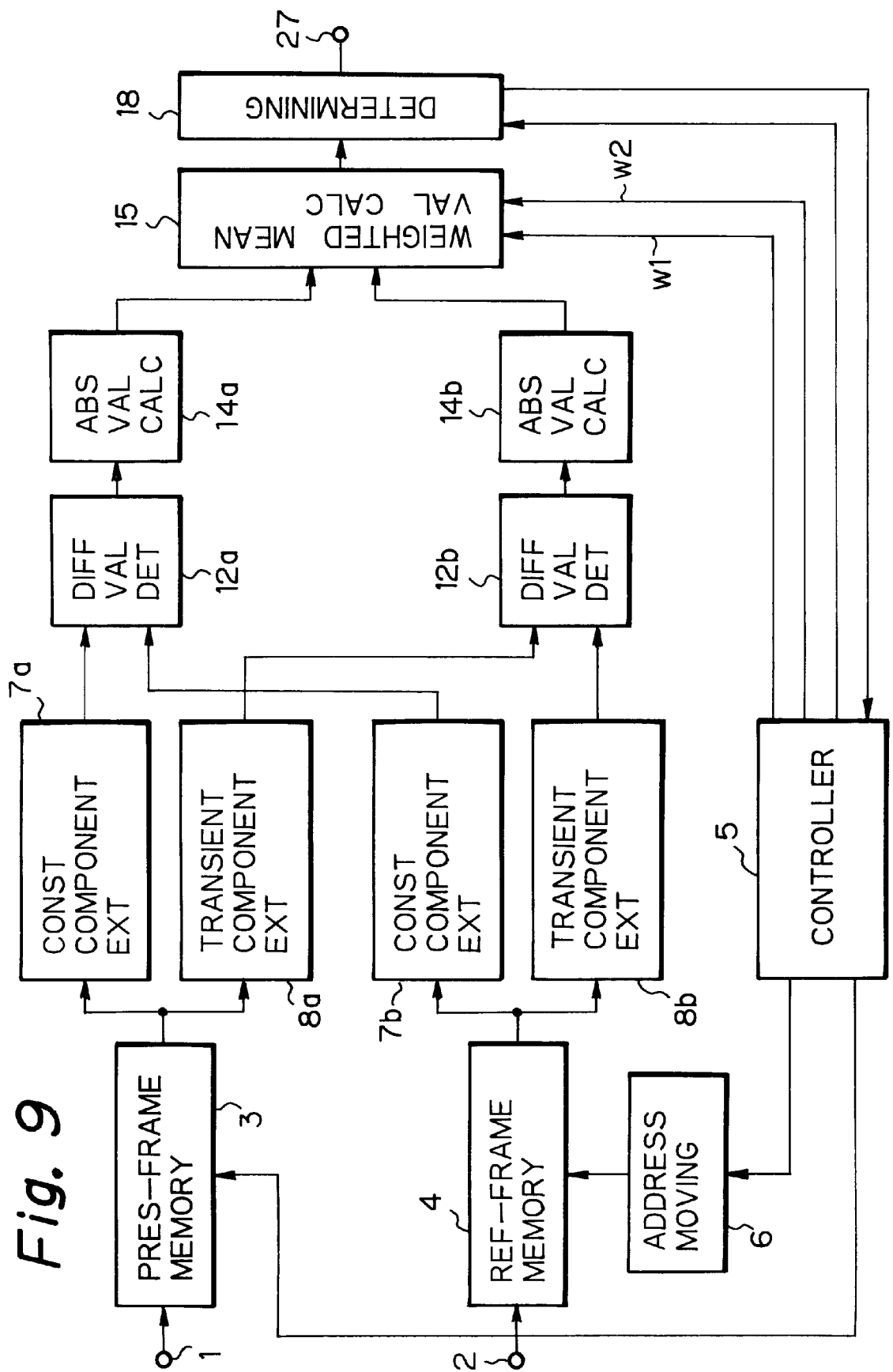
FIG. 9 is a block diagram showing a circuit for producing a motion vector according to the present invention.

Referring now to the drawings, and in particular to FIG. 9, there is illustrated a motion vector detecting circuit according to the present invention. The circuit illustrated in FIG. 9 is adapted to extract a constant component and a transient component for a base block of the present frame and each position within a predetermined search range of the inspection block of a reference frame, to obtain the respective differences between the constant components and the transient components of the base and inspection blocks, to produce an evaluating value as a function of the respective differences, to select the minimum evaluating value and to generate a motion vector between the base block and the best matching block, that is, the block corresponding to the position of the inspection block associated with the minimum evaluating value.

Image data for a present frame is applied to an input terminal 1, which supplies the image data to a present frame memory 3 for storage. Image data for a reference frame is applied to an input terminal 2, which supplies the image data to a reference frame memory 4 for storage.

Controller 5 is adapted to control reading and writing of the present frame memory 3 and the reference frame memory 4 which respectively supply pixel data of a base block of the present frame and pixel data of an inspection block of the reference frame to constant component extracting circuits 7a, 7b and transient component extracting circuits 8a, 8b. An address moving circuit 6 is associated with the reference-frame memory 4. The controller 5 is also adapted to control the address moving circuit 6 to apply read addresses to the reference frame memory 4 which move, pixel by pixel, the center position of the inspection block in the predetermined searching range.

The constant component extracting circuit 7a is operative to extract the constant component from a base block of pixels of the present frame, and to supply the constant component to a differential value detecting circuit 12a. The constant component extracting circuit 7b is operative to extract the constant component from an inspection block of pixels of the reference frame, and to supply the constant component to the differential value detecting circuit 12a.

The transient component extracting circuit 8a is operative to extract the transient component from a base block of pixels of the present frame, and to supply the transient component to a differential value detecting circuit 12b. The transient component extracting circuit 8b is operative to extract the transient component from an inspection block of pixels of the reference frame, and to supply the transient component to the differential value detecting circuit 12a.

The differential value detecting circuits 12a, 12b are each adapted to obtain the differential value between the respective components of the base block and inspection block and to supply the differential values to absolute value calculating circuits 14a, 14b, respectively, which serve to obtain the absolute values of the differential values and to supply the absolute values to a weighted mean calculating circuit 15.

The controller 5 functions to supply weighted coefficients w1 and w2 to the weighted mean value calculating circuit 15. By experience, the coefficients w1 and w2 may have, for example, the ratio w1/w2=1/(1.5). The coefficient w1 should be increased if the picture has small areas with motion. The coefficient w2 should be increased if the picture has large areas with motion or the camera was moving while the picture was taken.

The weighted mean value calculating circuit 15 is operative to weight and combine the absolute value of the differences of the constant components of the base and inspection blocks with the absolute value of the differences of the transient components of the base and inspection blocks to produce an evaluating value for the base block relative to the inspection block at a particular position in the predetermined search range, and to supply the evaluating values for each of the positions of the inspection block to a determining circuit 18.

The determining circuit 18 serves to identify the minimum evaluating value in the predetermined search range. The best matching block in the predetermined search range of the reference frame corresponds to the minimum evaluating value. The circuit 18 also serves to produce a motion vector between the base block of the present frame and the best matching block in the predetermined search range of the reference frame and to supply this motion vector to an output terminal 27.

The controller 5 controls the determining circuit 18. The motion vector produced by the determining circuit 18 is supplied to the controller 5.

Figure 10:
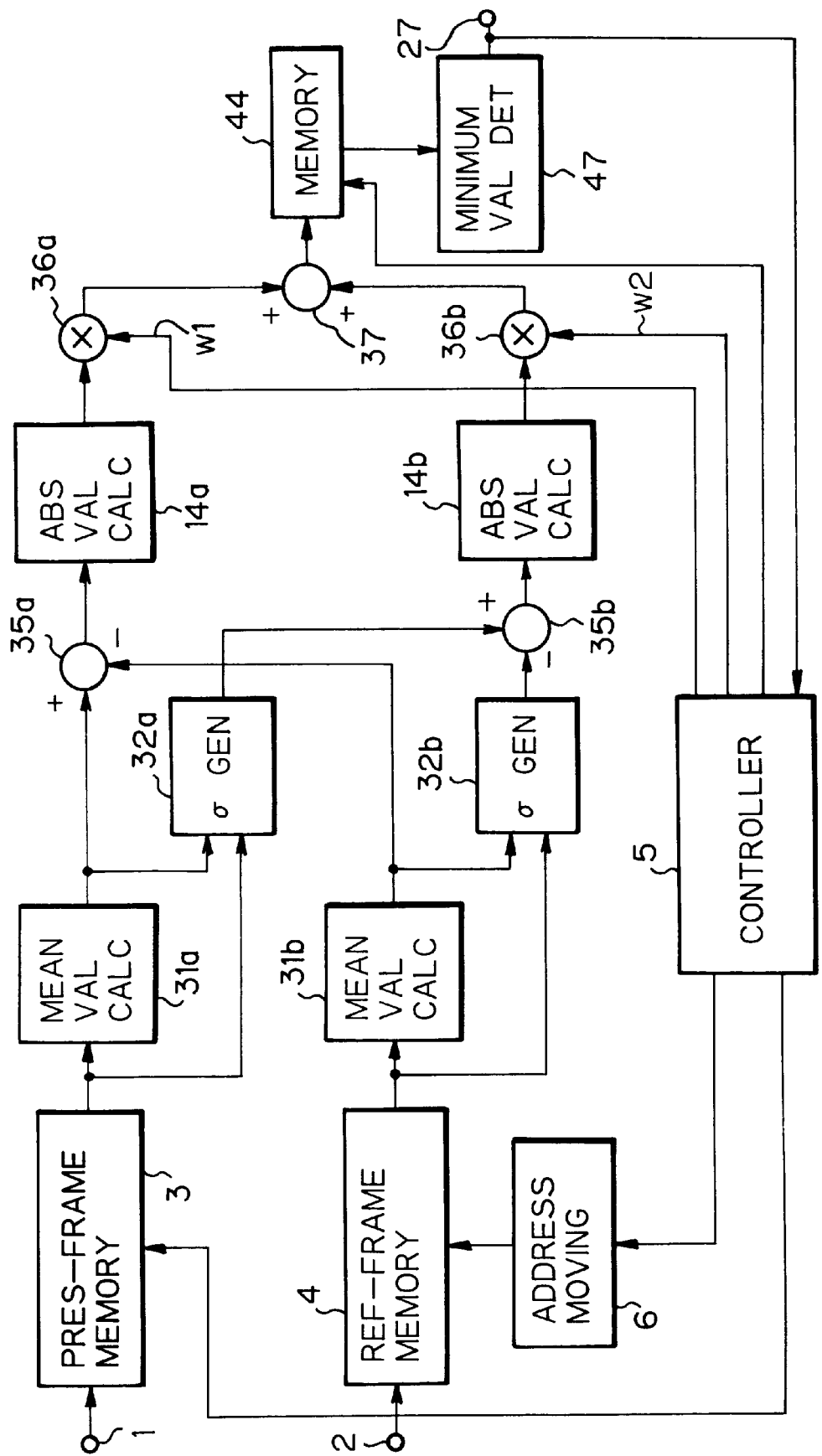
FIG. 10 is a block diagram showing a more specific embodiment of the circuit shown in FIG. 9.

FIG. 10 shows a specific embodiment of the motion vector detecting circuit of FIG. 9.

The constant component extracting circuits 7a and 7b of FIG. 9 comprise mean value calculating circuits 31a and 31b in FIG. 10. The transient component extracting circuits 8a and 8b of FIG. 9 comprise standard deviation (σ) generating circuits 32a and 32b in FIG. 10. The differential value detecting circuits 12a and 12b of FIG. 9 comprise subtracters 35a and 35b, respectively, in FIG. 10.

The weighted mean value calculating circuit 15 of FIG. 9 comprises multipliers 36a and 36b and adder 37 in FIG. 10. The multipliers 36a and 36b multiply their input values by weighting coefficients w1 and w2, respectively. The adder 37 adds the outputs of the multipliers 36a and 36b.

The determining circuit 18 of FIG. 9 comprises memory 44 and minimum value detecting circuit 47 in FIG. 10. The memory 44 stores weighted mean value data (evaluating values). The minimum value detecting circuit 47 detects the minimum of the evaluating values stored in the memory 44 and outputs a motion vector corresponding to the inspection block position associated with the minimum value. The memory 44 may be omitted from the determining circuit 18.

Operation of the motion vector detecting circuit shown in FIG. 10 will now be described. In this description, the size of each of the base and inspection blocks supplied from the memories 3, 4 is (4 pixels×4 lines), and the pixels in each (4×4) block are denoted by $x_1$ to $x_{16}$.

The mean value calculating circuit 31a calculates a mean value m of each (4×4) base block as follows:

$$m=(x_1+x_2+ \ldots +x_{16})/16$$

The standard deviation generating circuit 32a calculates a standard deviation σ of each (4×4) base block as follows:

$$\sigma = \left(\sum_{i=1}^{16}(x_i-m)^2 \cdot 1/16\right)^{1/2}$$

The mean value calculating circuit 31b and the standard deviation generating circuit 32b generate a mean value m' and a standard deviation σ' for each position of the inspection block.

The subtracter 35a calculates a differential value of corresponding mean values, m–m'. The subtractor 35b calculates a differential value of corresponding standard deviations, σ–σ'. The absolute value calculating circuits 14a, 14b obtain the absolute values of these quantities, respectively, which are multiplied by the weights w1, w2, respectively and summed by adder 37 to produce an evaluating value as follows:

$$\text{evaluating\_value}=(w1 \cdot |m-m'|)+(w2 \cdot |\sigma-\sigma'|)$$

Let the position of a base block be (x, y) and the position of an inspection block be (x+Δx, y+Δy) (where Δx and Δy represent variations of four pixels and four lines, respectively). The above-described feature values can be expressed as follows:

$$Hm(\Delta x, \Delta y)=|m'(x+\Delta x, y+\Delta y)-m(x, y)|$$

$$H\sigma(\Delta x, \Delta y)=|\sigma'(x+\Delta x, y+\Delta y)-\sigma(x, y)|$$

The weighted mean calculating circuit, comprising the multipliers 36a and 36b and the adder 37, generates an evaluating value H as follows:

$$H(\Delta x, \Delta y)=(w1 \cdot Hm(\Delta x, \Delta y))+(w2 \cdot H\sigma(\Delta x, \Delta y))$$

When an inspection block is varied by Δx and Δy (for example, four pixels and four lines), an evaluating value is obtained. The evaluating values are stored in the memory 44. The minimum value detecting circuit 47 detects the minimum of the evaluating values stored in the memory 44. The values of Δx and Δy corresponding to the position of the minimum value comprise the motion vector supplied to output terminal 27.

The circuit shown in FIG. 10 represents each (4×4) block by a mean value and a standard deviation. In addition, since the searching process is performed every four pixels, it is simplified by 1/16. Thus, the number of arithmetic operations performed in the present invention is remarkably reduced from that of the conventional full-search block matching process.

If desired, the evaluating values may be obtained and motion vectors generated by software processes.

A motion vector may be obtained at an accuracy of one half-pixel, rather than one pixel.

The present invention may also be applied when a motion vector is detected between two still images or when a motion vector is detected between images with different resolutions.

Figure 11B:
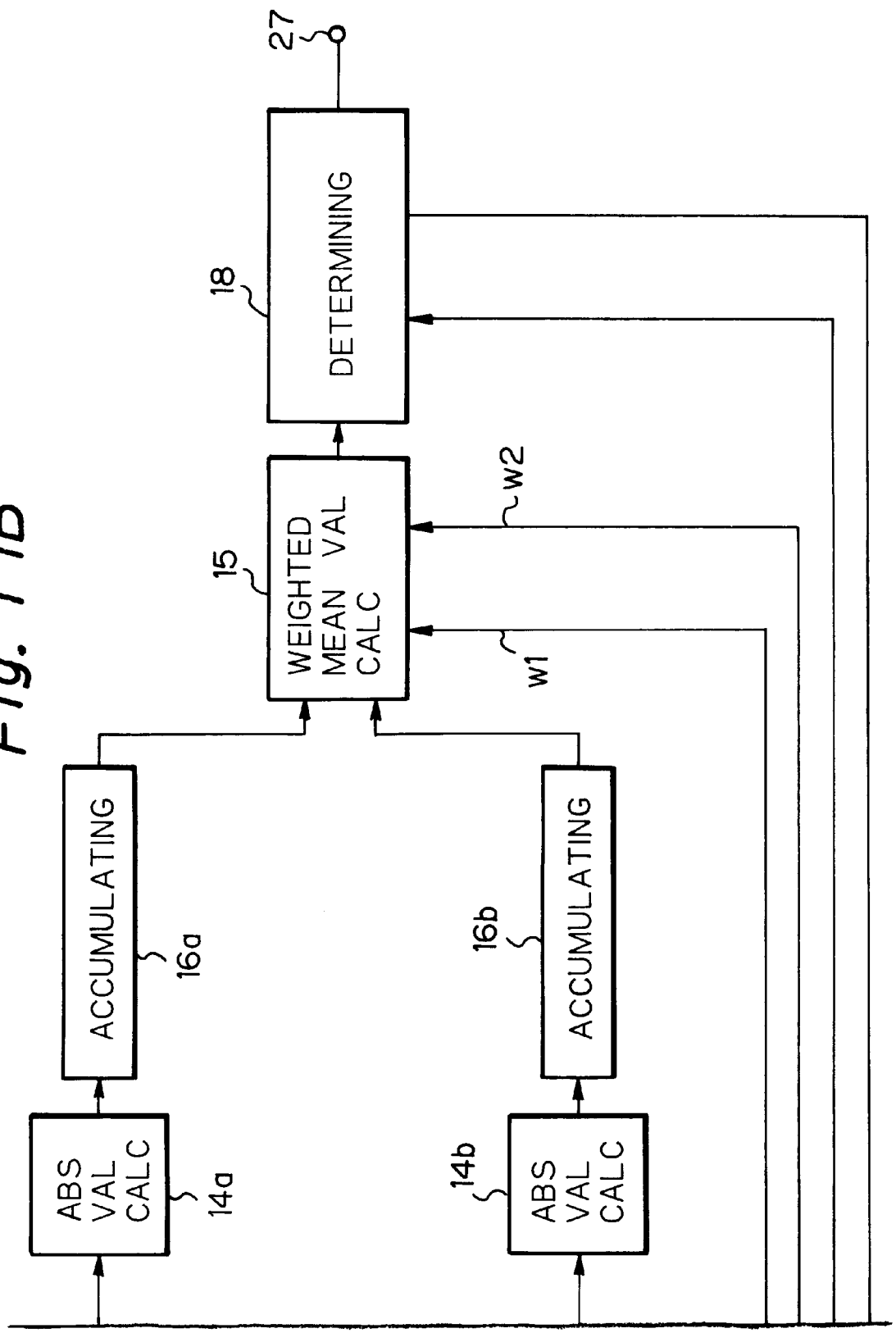
FIG. 11 is a block diagram showing another circuit for producing a motion vector according to the present invention.

FIG. 11 shows another embodiment of a motion vector detecting circuit according to the present invention. The embodiment shown in FIG. 11 is similar to that shown in FIG. 9, except the circuit of FIG. 11 also includes small block segmenting circuits 11a, 11b and accumulating circuits 16a, 16b.

A base block of size (16 pixels×16 lines) is supplied from present frame memory 3 to segmenting circuit 11a which is adapted to divide the (16×16) block into four (4×4) blocks, and to sequentially supply these blocks to constant and transient component extracting circuits 7a, 8a.

Alternatively, a (16×16) block may be divided to form stripe shaped blocks, such as four (4×16) and four (16×4) blocks. Additionally, small blocks may overlap each other so that a motion vector may be obtained at an improved accuracy of, for example, one-half pixel.

An inspection block of size (16×16) is supplied from reference frame memory 4 to segmenting circuit 11b which is adapted to divide the (16×16) block into four (4×4) blocks, and to sequentially supply these blocks to constant and transient component extracting circuits 7b, 8b.

Differential value detecting circuits 12a, 12b obtain the difference between the constant and transient components of the small blocks of the base and inspection blocks. Accumulating circuits 16a, 16b sum the absolute values of the differences between the constant and transient components of the small blocks of the base and inspection blocks. Weighted mean value calculating circuit 15 combines the results by, for example, weighting the sum of the absolute values of the differences between the constant components of the small blocks of the base and inspection blocks by a value w1, weighting the sum of the absolute values of the differences between the transient components of the small blocks of the base and inspection blocks by a value w2, and summing the weighted values to produce an evaluating value for the (16×16) base block relative to the inspection block.

Figure 12B:
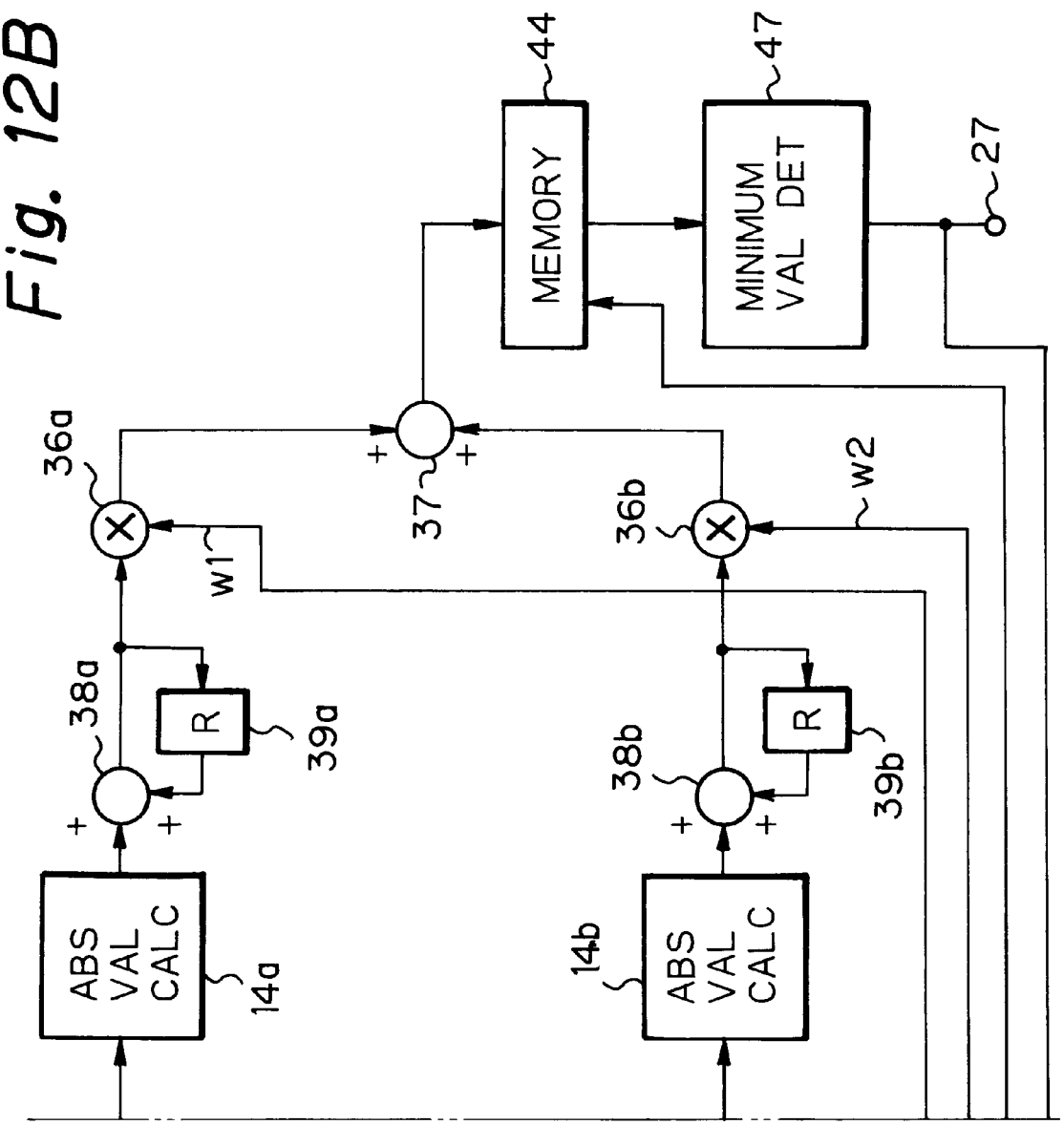
FIG. 12 is a block diagram showing a more specific embodiment of the circuit shown in FIG. 11.

FIG. 12 shows a specific embodiment of the motion vector detecting circuit of FIG. 11.

As explained for FIG. 10 relative to FIG. 9, the constant component extracting circuits 7a and 7b of FIG. 11 comprise mean value calculating circuits 31a and 31b in FIG. 12. The transient component extracting circuits 8a and 8b of FIG. 11 comprise standard deviation (σ) generating circuits 32a and 32b in FIG. 12. The differential value detecting circuits 12a and 12b of FIG. 11 comprise subtracters 35a and 35b, respectively, in FIG. 12. The weighted mean value calculating circuit 15 of FIG. 11 comprises multipliers 36a and 36b and adder 37 in FIG. 12. The determining circuit 18 of FIG. 11 comprises memory 44 and minimum value detecting circuit 47 in FIG. 12.

The accumulating circuits 16a, 16b of FIG. 11 comprise adder 38a and register 39a, and adder 38b and register 39b, respectively. The adders 38a, 38b combine the feature value for the small block supplied from absolute value calculating circuit 14a, 14b, respectively, with the other feature values for the block to which the small block belongs. The sum of these other feature values is stored in register 39a, 39b, respectively.

Let the mean values of the four small blocks in a base block be denoted as m1 . . . m4, the mean values of the four small blocks in an inspection block be denoted as m1' . . . m4', the standard deviations of the four small blocks in a base block be denoted as σ1 . . . σ4, and the standard deviations of the four small blocks in an inspection block be denoted as σ1' . . . σ4'. The constant component differential feature value of the (16×16) base block relative to the inspection block supplied to multiplier 36a is given by the following:

$$Hm=|m1-m1'|+|m2-2'|+|m3-m3'|+|m4-m4'|$$

The transient component differential feature value of the (16×16) base block relative to the inspection block supplied to the multiplier 38b is given by the following:

$$Hο=|ο1-ο1'|+|ο2-ο2'|+|ο3-ο3'|+|ο4-ο4'|$$

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. Apparatus for detecting motion vector by comparing a base block in a current frame to inspection blocks in a predetermined search area in a reference frame, comprising:

means for supplying image data of said base block in said current frame wherein said base block comprises pixels having respective values;

first extracting means for extracting a first base component and a second base component from said base block;

means for sequentially supplying image data of each of said inspection blocks in the predetermined search area in said reference frame wherein each inspection block comprises pixels having respective values and wherein one pixel in each of said inspection blocks corresponds to one pixel in said base block;

second extracting means for extracting a first inspection component and a second inspection component from each of said inspection blocks, wherein said first inspection and said second inspection components are of the same type as said first base and said second base components, respectively; and comparing means for comparing said first base component to said first inspection component extracted from each of said inspection blocks and said second base component to said second inspection component extracted from each of said inspection blocks to determine the position of an inspection block in the predetermined search area in said reference frame which best matches said base block in said current frame, wherein said comparing means includes first difference means for obtaining, for each individual one of said inspection blocks, a first difference between said first base component of said base block and said first inspection component of the individual inspection block, and second difference means for obtaining, for each individual one of said inspection blocks, a second difference between said second base component of said base block and said second inspection component of the individual inspection block, and;

determining means for determining the best matching position of said inspection blocks in said reference frame as a function of said first and second differences;

wherein said determining means includes first absolute value means for producing an absolute value of said first difference, second absolute value means for producing an absolute value of said second difference, and adding means for adding the absolute values of said first and second differences.

2. The apparatus of claim 1 wherein said adding means includes first multiplying means for multiplying said absolute value of said first difference by a first weighting value and second multiplying means for multiplying said absolute value of said second difference by a second weighting value.

3. A method for detecting motion vector by comparing a base block in a current frame to inspection blocks in a predetermined search area in a reference frame, comprising the steps of:

supplying image data of said base block in said current frame wherein said base block comprises pixels having respective values;

extracting a first base component and a second base component from said base block;

sequentially supplying image data of each of said inspection blocks in the predetermined search area in said reference frame wherein each inspection block comprises pixels having respective values and wherein one pixel in each of said inspection blocks corresponds to one pixel in said base block;

extracting a first inspection component and a second inspection component from each of said inspection blocks, wherein said first inspection and said second inspection components are of the same type as said first base and said second base components, respectively; and comparing said first base component to said first inspection component extracted from each of said inspection blocks and said second base component to said second inspection component extracted from each of said inspection blocks to determine the position of an inspection block in the predetermined search range in said reference frame which best matches said base block in said current frame;

wherein said comparing includes obtaining, for each individual one of said inspection blocks, a first difference between said first base component of said base block and said first inspection component of the individual inspection block, obtaining a second difference between said second base component of said base block and said second inspection component of the individual inspection block, and determining the best matching position of said inspection blocks in said reference frame as a function of said first and second differences, said determining including producing an absolute value of said first difference, producing an absolute value of said second difference, and adding the absolute values of said first and second differences.

4. The method of claim 3 wherein the step of adding includes multiplying said absolute value of said first difference by a first weighting value and multiplying said absolute value of said second difference by a second weighting value.

5. Apparatus for detecting a motion vector by comparing a base block in a current frame to inspection blocks in a predetermined search area in a reference frame, comprising:

first extracting means for extracting a first base component and a second base component from the same pixels of the same base block in said current frame;

second extracting means for extracting a first inspection component and a second inspection component from each of said inspection blocks, wherein said first inspection and said second inspection components are of the same type as said first base and said second base components, respectively; and comparing means for comparing said first base component to said first inspection component extracted from each of said inspection blocks and said second base component to said second inspection component extracted from each of said inspection blocks to determine the position of an inspection block in the predetermined search range in said reference frame which best matches said base block in said current frame.

6. The apparatus of claim 5 further comprising first memory means for storing and reading out said base block, and second memory means for storing a predetermined search range of said reference frame and reading out said inspection blocks.

7. The apparatus of claim 3 wherein said comparing means includes first difference means for obtaining a first difference between said first base component of said base block and said first inspection component of an individual one of said inspection blocks, second difference means for obtaining a second difference between said second base component of said base block and said second inspection component of said inspection block, and determining means for determining the best matching position of said inspection blocks in said reference frame as a function of said first and second differences.

8. The apparatus of claim 5 wherein said means for comparing is also operative to produce a motion vector between said base block and said inspection block at the best matching position of said inspection blocks.

9. The apparatus of claim 5 wherein said first base component is one of a mean value of said pixels of said base block, low order component of a set of orthogonally transformed coefficients corresponding to said pixels of said base block, maximum value of said pixels of said base block, and minimum value of said pixels of said base block; wherein said second base component is one of a standard deviation of said pixels of said base block, high order component of a set of orthogonally transformed coefficients corresponding to said pixels of said base block, dynamic range of said pixels of said base block, difference of mean values of said pixels of said base block, and maximum value of differences of mean values of said pixels of said base block; wherein said first inspection component is one of a mean value of pixels of an individual one of said inspection blocks, low order component of a set of orthogonally transformed coefficients corresponding to said pixels of said individual inspection block, maximum value of said pixels of said individual inspection block, and minimum value of said pixels of said individual inspection block; and wherein said second inspection component is one of a standard deviation of said pixels of said individual inspection block, high order component of a set of orthogonally transformed coefficients corresponding to said pixels of said individual inspection block, dynamic range of said pixels of said individual inspection block, difference of mean values of said pixels of said individual inspection block, and maximum value of differences of mean values of said pixels of said individual inspection block.

10. The apparatus of claim 5 further comprising small block forming means for forming said base block and an individual one of said inspection blocks into respective small blocks, for supplying the small blocks of said base block to said first extracting means and for supplying the small blocks of said individual inspection block to said second extracting means.

11. The apparatus of claim 10 wherein said comparing means includes:
first difference means for obtaining first differences between the first base component of said small blocks of said base block and the first inspection component of said individual inspection block,
first accumulating means for combining said first differences to produce a first cumulative difference,
second difference means for obtaining second differences between the second base component of said small blocks of said base block and the second inspection component of said individual inspection block,
second accumulating means for combining said second differences to produce a second cumulative difference, and
determining means for determining the best matching position of said inspection blocks in said reference frame as a function of said first and second cumulative differences.

12. A method for detecting a motion vector by comparing a base block in a current frame to inspection blocks in a predetermined search area in a reference frame, comprising the steps of:
extracting a first base component and a second base component from the same pixels of the same base block in said current frame;
extracting a first inspection component and a second inspection component from each of said inspection blocks, wherein said first inspection and said second inspection components are of the same type as said first base and said second base components, respectively; and
comparing said first base component to said first inspection component extracted from each of said inspection blocks and said second base component to said second inspection component extracted from each of said inspection blocks to determine the position of an inspection block in the predetermined search range in said reference frame which best matches said base block in said current frame.

13. The method of claim 12 further comprising the steps of storing and reading out said base block, and storing a predetermined search range of said reference frame and reading out said inspection blocks.

14. The method of claim 12 wherein the step of comparing includes a first difference between said first base component of said base block and said first inspection component of an individual one of said inspection blocks, obtaining a second difference between said second base component of said base block and said second inspection component of said individual inspection block, and determining the best matching position of said inspection blocks in said reference frame as a function of said first and second differences.

15. The method of claim 12 further comprising the step of producing a motion vector between said base block and said inspection block at the best matching position of said inspection blocks.

16. The method of claim 12 wherein said first base component is one of a mean value of said pixels of said base block, low order component of a set of orthogonally transformed coefficients corresponding to said pixels of said base block, maximum value of said pixels of said base block, and minimum value of said pixels of said base block; wherein said second base component is one of a standard deviation of said pixels of said base block, high order component of a set of orthogonally transformed coefficients corresponding to said pixels of said base block, dynamic range of said pixels of said base block, difference of mean values of said pixels of said base block, and maximum value of differences of mean values of said pixels of said base block; wherein said first inspection component is one of a mean value of pixels of an individual one of said inspection blocks, low order component of a set of orthogonally transformed coefficients corresponding to said pixels of said individual inspection block, maximum value of said pixels of said individual inspection block, and minimum value of said pixels of said individual inspection block; and wherein said second inspection component is one of a standard deviation of said pixels of said individual inspection block, high order component of a set of orthogonally transformed coefficients corresponding to said pixels of said individual inspection block, dynamic range of said pixels of said individual inspection block, difference of mean values of said pixels of said individual inspection block, and maximum value of differences of mean values of said pixels of said individual inspection block.

17. The method of claim 12 further comprising the step of forming said base block and said inspection blocks, and wherein the step of extracting a first base component and a second base component is applied to the small blocks of said base block, and the step of extracting a first inspection component and a second inspection component is applied to the small blocks of an individual one of said inspection blocks.

18. The method of claim 17 wherein the step of comparing includes
   obtaining first differences between the first base component of said small blocks of said base block and the first inspection component of said individual inspection block,
   combining said first differences to produce a first cumulative difference,
   obtaining second differences between the second base component of said small blocks of said base block and the second inspection component of said individual inspection block,
   combining said second differences to produce a second cumulative difference, and
   determining the best matching position of said inspection blocks in said reference frame as a function of said first and second cumulative differences.

19. Apparatus for detecting a motion vector by comparing a base block in a current frame to inspection blocks in a predetermined search area in a reference frame, comprising:
   first extracting means for extracting a constant component and a transient component from the same pixels of the same base block in said current frame;
   second extracting means for extracting a constant component and a transient component from each of said inspection blocks; and
   comparing means for comparing said constant component extracted from said base block to said constant component extracted from each inspection block, and said transient component extracted from said base block to said transient component extracted from each inspection block, to determine the position of an inspection block in the predetermined search range in said reference frame which best matches said base block in said current frame.

20. A method for detecting a motion vector by comparing a base block in a current frame to inspection blocks in a predetermined search area in a reference frame, comprising the steps of:
   extracting a constant component and a transient component from the same pixels of the same base block in said current frame;
   extracting a constant component and a transient component from each of said inspection blocks; and
   comparing said constant component extracted from said base block to said constant component extracted from each of said inspection blocks, and comparing said transient component extracted from said base block to said transient component extracted from each of said inspection blocks to determine the position of an inspection block in the predetermined search range in said reference frame which best matches said base block in said current frame.

* * * * *